United States Patent [19]

Bolas et al.

[11] Patent Number: 5,253,832
[45] Date of Patent: Oct. 19, 1993

[54] SPRING COUNTERBALANCED BOOM SUSPENSION SYSTEM

[76] Inventors: Mark T. Bolas, 220 Curtner St., Apt. O, Palo Alto, Calif. 94306; Russell C. Mead, Jr., 262 Princeton, Menlo Park, Calif. 94025

[21] Appl. No.: 735,516

[22] Filed: Jul. 26, 1991

[51] Int. Cl.$^5$ .................................. F16M 13/00
[52] U.S. Cl. .......................... 248/123.1; 248/280.1
[58] Field of Search ............... 248/123.1, 280.1; 212/195; 901/48; 267/174, 179

[56] References Cited

U.S. PATENT DOCUMENTS

| | | |
|---|---|---|
| Re. 32,213 | 7/1986 | Brown . |
| 2,103,013 | 12/1937 | Nirdlinger . |
| 2,156,862 | 5/1939 | Maugard . |
| 2,459,722 | 1/1949 | Price . |
| 2,479,720 | 8/1949 | Brandt . |
| 4,017,168 | 4/1977 | Brown . |
| 4,156,512 | 5/1979 | Brown . |
| 4,165,530 | 8/1979 | Sowden . |
| 4,208,028 | 6/1980 | Brown et al. . |
| 4,235,405 | 11/1980 | Carey . |
| 4,247,067 | 1/1981 | Smith . |
| 4,266,747 | 5/1981 | Souder, Jr. et al. . |
| 4,364,535 | 12/1982 | Itoh et al. . |
| 4,394,075 | 7/1983 | Brown et al. . |
| 4,515,333 | 5/1985 | Pugh et al. ......... 248/123.1 X |
| 4,577,819 | 3/1986 | Bennett . |
| 4,621,786 | 11/1986 | Greenlee . |
| 4,685,649 | 8/1977 | McKay . |
| 4,849,778 | 7/1989 | Samuelson . |

Primary Examiner—Blair M. Johnson
Attorney, Agent, or Firm—Fulwider Patton Lee & Utecht

[57] ABSTRACT

The spring counterbalanced boom suspension system is designed for suspending a viewer for use in a visual virtual environment system. The spring counterbalanced boom suspension has an improved range of motion which allows for fully counterbalanced movement of the viewing device to a vertical positions, and to horizontal positions on either side of the vertical. The viewer is suspended by a counterbalanced boom arm which is in turn supported by a cantilever arm pivotably and rotatably connected to a support structure. A tension spring is connected between the support structure and an attachment point on the cantilever arm by a cable for counterbalancing the weight of the viewing means and the boom arm. The spring tension and preload are adjusted to the geometry and counterbalancing weight of the suspension system, and the cantilever arm is capable of a fully counterbalanced range of motion. A pair of pulleys are preferably mounted to the upper end of the support structure to provide a channel through which the cable passes.

16 Claims, 9 Drawing Sheets

SPRING COUNTERBALANCED BOOM SUSPENSION SYSTEM

BACKGROUND OF THE INVENTION

1. Field of the Invention

This invention relates generally to counterbalanced viewing apparatus boom suspension systems, and more particularly relates to a spring counterbalanced cantilever arm suspension system for remote stereoscopic CRT monitors for three dimensional computer or camera generated simulation environments.

2. Description of Related Art

Visual presentations of environments for computer or camera generated simulations are useful in many fields, such as three dimensional biomedical modeling of patient anatomy before surgery, architecture, flight training experiences, and wind tunnel behavior of aircraft structures, for example. This type of visual presentation can be particularly useful if presented stereoscopically, with CRT or LCD viewing devices providing binocular views from slightly different angles to allow the perception of depth in the views presented. Such viewing devices increase the illusion of presence in the scenes presented, and have therefore generally been referred to as providing a visual virtual environment, and more popularly as "virtual reality".

Head mounted stereoscopic viewers with sensors to give the visual virtual environment system feedback as to the orientation of viewing have been developed to allow the user to control the angle of view and appearance of movement through the projected visual environment by movement of the head mounted viewer. While some have been developed as helmets to be worn on the head, the weight of a unit including binocular CRT screens can be uncomfortable, if not suspended or at least partially supported. Such supported stereoscopic viewing devices are typically suspended by an articulated, counterbalanced boom having sensors at the joints of the boom and the viewing device to generate data concerning the position and orientation of the viewing device.

While counterbalancing the viewing device can remove the burden of carrying the full weight of the viewing device from the user, the total mass of the system is increased. In systems where the head mounted viewing device is provided in the form of a helmet or is strapped to the head of the user, the problem of overcoming the inertia of the viewing system can also make the system difficult to use. Helmet type viewing devices also are not easily left in a desired position and angle of view while a user attends to some other task, making it difficult for a user to look away to a control panel or keyboard. It has been found that it is useful to provide a free standing, fully suspended and counterbalanced stereoscopic viewer which can be used simply like a pair of binoculars which can be left in a desired position and angular orientation, and from which the user can easily look away to have ready access to a control system, such as a keyboard and computer monitor, for controlling various modes of operation of the visual virtual environment system. In such freely suspended viewing systems, due to the weight of the viewing device and the counterweights employed, moving the viewing device for a change of position or angle of view can produce a momentum in the suspension system and viewing device which can tend to carry the device beyond the position or angle desired, so that it would be desirable to reduce the overall inertia of the suspension system.

A conventional counterweighted boom suspension system also typically has a limited range of pivoting motion, since the counterweight on the boom can interfere with movement of the boom to a vertical position. Movement of such a conventional viewing device from a position on one side of the vertical line from the support base to an opposite side can typically be accomplished by a 180 degree rotation of the boom and realignment of the viewing device. It would therefore be desirable to provide a counterbalanced boom suspension system with an improved range of motion which would allow for fully counterbalanced movement of the viewing device to a raised vertical position and to opposing lowered horizontal positions. The present invention meets these needs.

SUMMARY OF THE INVENTION

Briefly, and in general terms, the present invention provides for a spring counterbalanced boom suspension for a viewing device for use in a visual virtual environment system, which the user can quickly and easily move to achieve the desired view, leave in place at a desired position and angle of view, and look away to have ready access to a control system, such as a keyboard and computer monitor. The spring counterbalanced boom suspension provides an improved range of motion which allows for fully counterbalanced movement of the viewing device to vertical and horizontal positions.

The invention thus provides for a viewing apparatus suspension system including viewing means for viewing an image, supported by a pivotable and rotatable mounting means. A cantilever arm is operatively connected to the pivotable and rotatable mounting means, and the cantilever arm is pivotably and rotatably connected to support means. Spring means are connected between the support means and an attachment point on the cantilever arm for counterbalancing the weight of the viewing means and the mounting means. The spring tension and preload are preferably adjusted to the geometry and counterbalancing weight of the suspension system, and the cantilever arm is capable of a fully counterbalanced range of motion about the pivot point between a vertical position and opposing horizontal positions.

In a preferred embodiment, the spring means comprises a coil tension spring disposed within the support means, and a cable connected between the spring and an attachment point on the cantilever arm. A pair of pulleys are preferably mounted to the upper end of the support means to provide a channel through which the cable passes. The cantilever arm is also preferably movable from a substantially horizontal position on one side of the support means through a vertical position and to a position on an opposite side of the support means. Handle means may also be provided for guiding the position and orientation of the viewing means. In a preferred embodiment of the invention, the mounting means for the viewing device includes a boom arm connected to the cantilever arm, and the boom arm includes a counterweight. In an alternate embodiment, the cantilever arm is counterbalanced by spring means disposed in the cantilever arm rather than in the support means.

These and other aspects and advantages of the invention will become apparent from the following detailed description, and the accompanying drawing, which illustrates by way of example the features of the invention.

DETAILED DESCRIPTION OF A PREFERRED EMBODIMENT

Both head mounted and suspended, counterbalanced viewing devices for visual virtual environment systems have suffered from problems of excessive weight. While counterbalancing the viewing device helps to relieve the burden of carrying the full weight of the viewing device from the user, the total mass of the system is actually increased. Helmet type viewing devices also can not easily be placed in a desired position, making it difficult for a user to look away to a control panel or keyboard, or to perform some other task. A conventional counterweighted suspension system also typically has a limited range of pivoting motion.

The invention thus advantageously provides for an improved counterbalanced boom suspension system for use with visual virtual environment systems, which utilizes a spring counterbalance in place of a counterweight, in order to reduce the weight of the suspension system, and at the same time to increase the range of motion of the boom arm.

Figure 1:
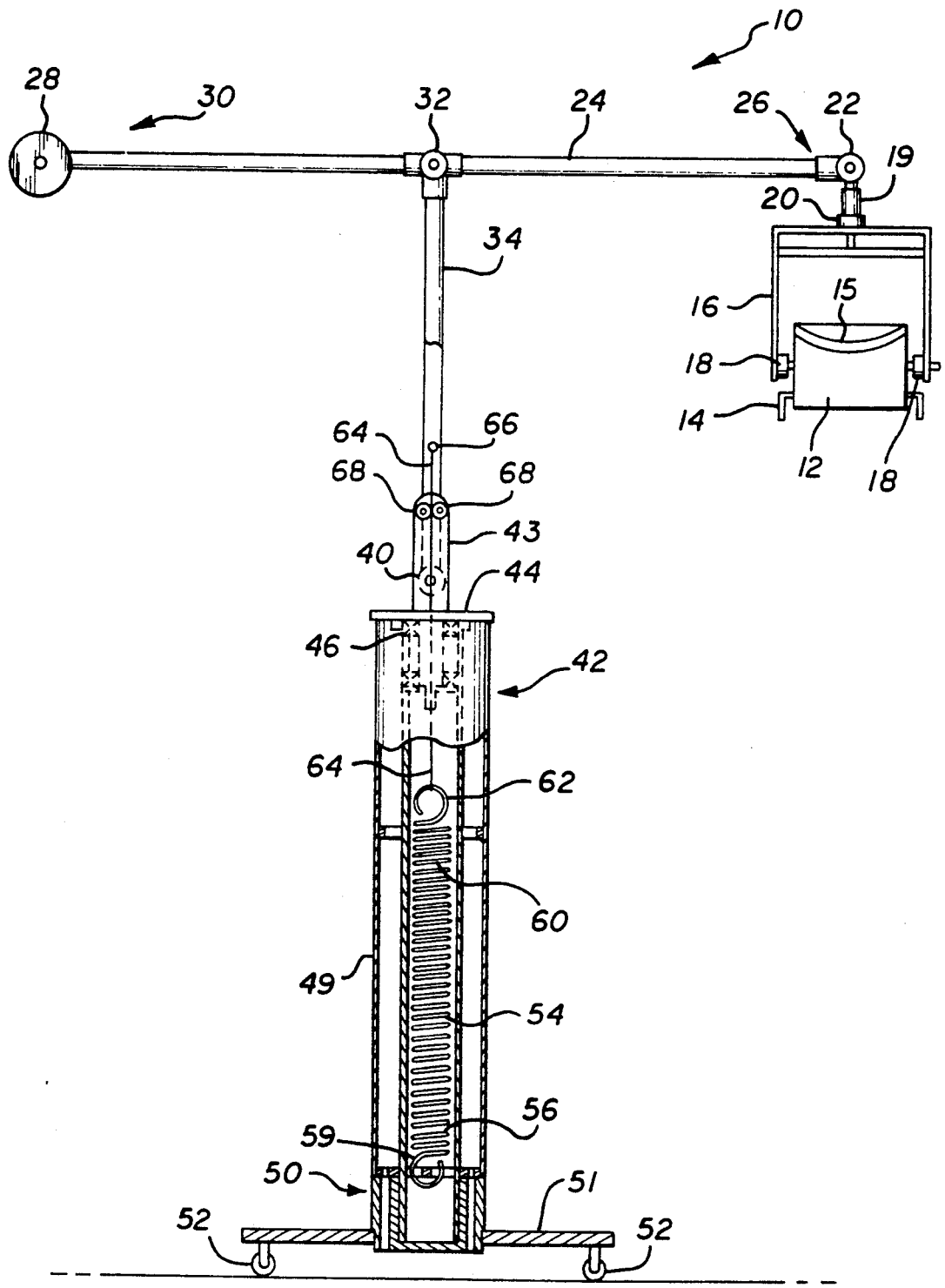
FIG. 1 is a front elevational, sectional view of the spring counterbalanced boom suspension system of the invention.
Figure 2:
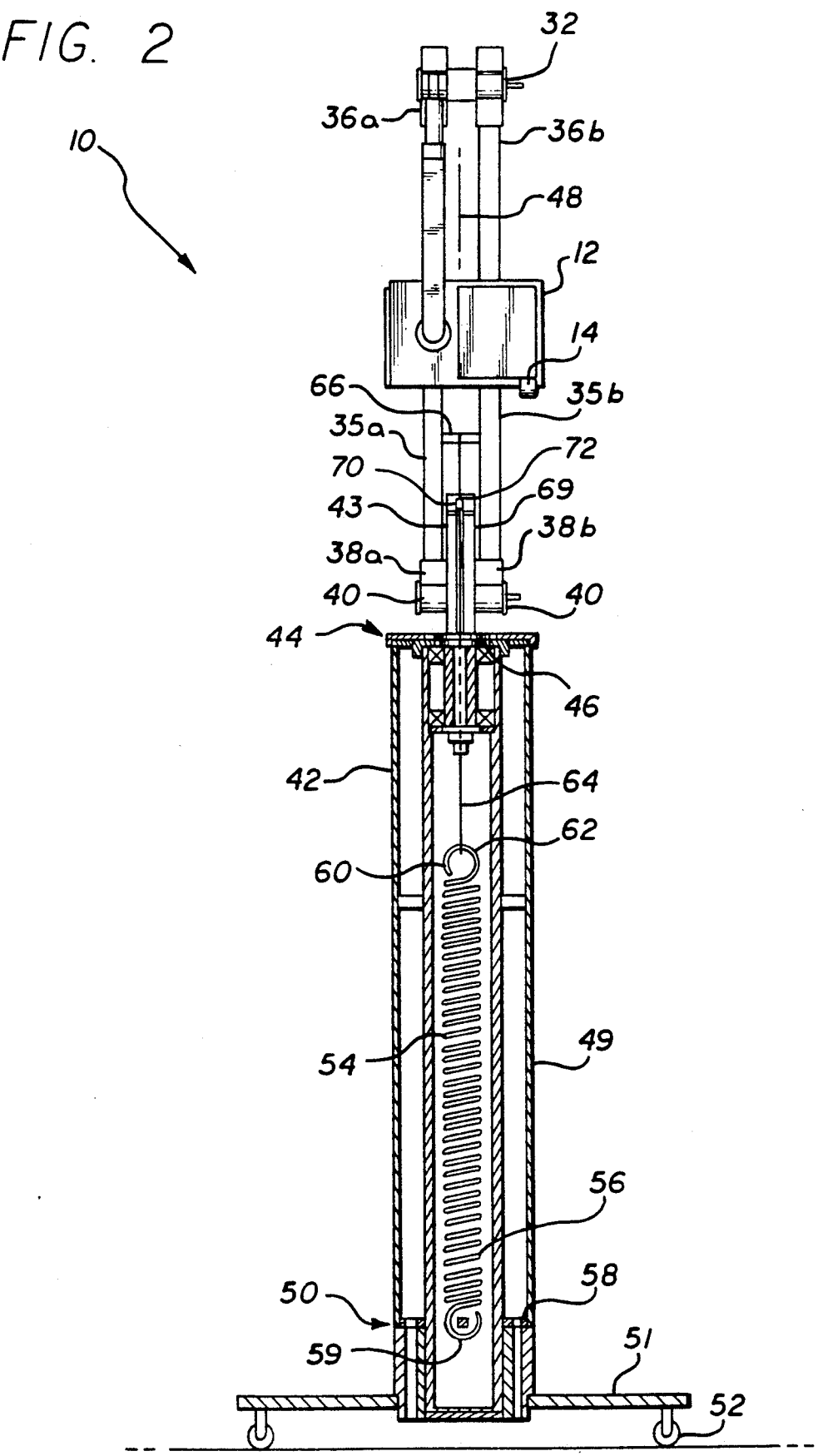
FIG. 2 is a side elevational, sectional view of the suspension system of the invention.
Figure 3:
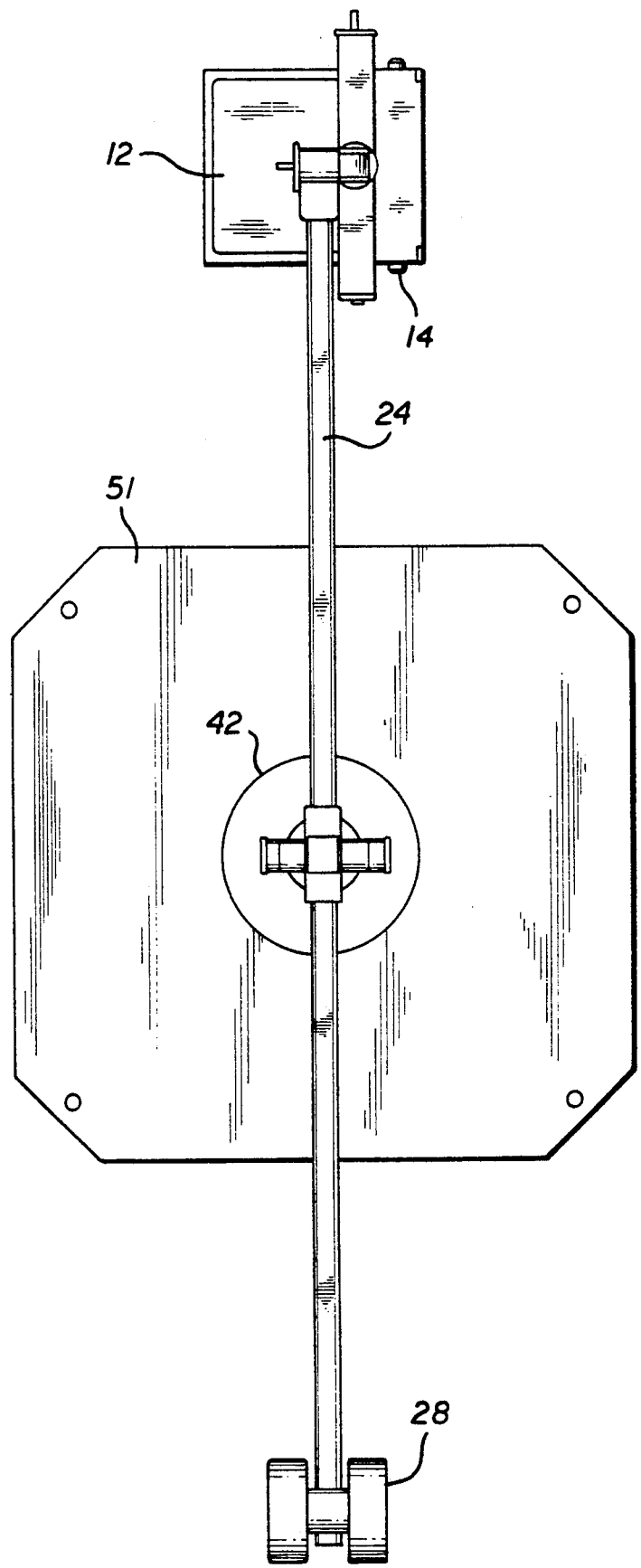
FIG. 3 is a top plan view of the suspension system of the invention.

As is illustrated in the drawings which are provided by way of example, and with particular reference to FIGS. 1 and 2, the invention is embodied in a viewing apparatus suspension system 10, preferably including a viewing device 12, such as a binocular, stereoscopic CRT based or LCD based viewer capable of presenting a three-dimensional image to a user. It is possible to use other types of viewing devices, such as a single CRT or LCD monitor, as well as other types of non-stereoscopic displays for example, but in a visual virtual environment system, it is most desirable to present a three-dimensional view to the user. The viewing device may also include one or two handles 14 to allow for easy manipulation by hand, and may include a head strap 15 to be worn snugly over the head of the user to allow for easy manipulation of the viewing device to change the angle or position of view simply by movement of the head.

The viewing device is preferably mounted in a housing or bracket 16 which allows the viewing device to rotate about horizontal and vertical axes. In the preferred embodiment, the viewing device is mounted by bearings 18 in a bracket allowing for rotation about a horizontal axis, and the bracket is preferably mounted to a short extension arm 19 by a bearing 20 allowing for rotation about a vertical axis. The bracket is also preferably suspended from a freely rotating pivot joint 22, supporting the weight of the viewing device and bracket so that the viewing device can always depend from the pivot joint in a vertical position for the user, regardless of the orientation of the rest of the suspension system.

In the preferred embodiment of the invention, the rotating pivot joint 22 is disposed at an end 26 of a counterbalanced boom arm 24. A counterweight 28 is typically placed at the opposite end 30 of the boom arm to counterbalance the weight of the viewing device and its mount. A pivot joint or bearing 32 is preferably located at the balance point of the boom arm, connecting the boom arm to a spring counterbalanced cantilever arm 34 to allow for pivotal movement of the boom arm about a horizontal axis. As can be best seen in FIG. 2, the cantilever arm preferably includes a pair of spaced apart arm members 35a,b connected at their distal extremities 36a,b by the pivot joint 32 to the boom arm. The proximal extremities 38a,b of the cantilever arm members are similarly connected by a proximal pivot joint or bearing 40 to a support structure 42. In the preferred embodiment, the proximal pivot joint of the cantilever arm is disposed on a vertical post member 43 at the upper or pivot end 44 of the support structure. The vertical post member is also preferably mounted by a rotation joint 46 at the upper end 44 of the support structure for rotation about a vertical axis 48. Thus, the cantilever arm is capable of pivoting about a horizontal axis and rotating about a vertical axis, to allow a full range of motion for the boom arm.

The support structure preferably includes a generally tubular housing 49, with a base end 50 and a platform 51 having three or more wheels 52, so that the suspension system can be conveniently free standing, and movable as desired. It would also be possible to mount the support structure to a fixed workstation or another type of fixture, or to other types of movable bases, such as a movable chair or vehicle, and the like, as desired.

A tension spring 54 is preferably disposed within the housing of the support structure, for counterbalancing the weight of the viewing device, and the boom arm and the mounting structure for the viewing device. The spring is preferably a coil spring having a lower end 56 connected to the base end 58 of the support structure by a connector ring 59, and an upper end 60 connected by another connector ring 62 to a cable 64. The cable may be a metal wire cable, a polymer fiber, such as nylon, string or rope, or various other similar, suitable materials. The cable is in turn connected to an attachment cross-bar 66 extending transversely between the two cantilever arms. A pair of pulleys 68 are preferably mounted on spindles to the support post member 43, which preferably comprises a pair of spaced apart support post members 69 between which the spindles extend, with the pulleys having grooved or indented surfaces 70 for retaining and supporting the cable, with the cable supporting surfaces of the grooves of the pulleys juxtaposed to provide a channel 72, which serves as a suspension point for the cable to the cantilever arm, through which the cable passes.

In the classical hypothetical situation in which a spring is connected to a vertical support and to an intermediate attachment point on a cantilever arm having a weight at the end of the arm, the spring force is directly proportional to the length of the spring between the support and the attachment point on the arm, for situations in which the arm is perfectly counterbalanced by the spring. Since this distance can become zero when the cantilever arm is in a vertical position, it is impossible for the cantilever arm to reach a vertical position due to interference by the free length of the spring.

In the boom suspension system of the invention, it is also impractical for the spring to extend to the attachment point on the cantilever arm, as this would interfere with the range of motion of the cantilever arm and the viewing device, particularly near the vertical position of the cantilever arm. In order to overcome the difficulty of interference by the spring with the cantilever arm and yet allow the spring force to be proportional to the positioning of the cantilever arm between the vertical and horizontal positions, the spring is preferably contained within the support housing, and is connected to the attachment point on the cantilever arm by the cable passing through the pair of pulleys on the upper end of the support structure. Thus, the spring essentially has a "zero free length," which is defined for purposes of this application as meaning that the spring force is directly proportional to the distance between the attachment point 66 and the location of the cable channel 72 between the pulleys. The spring does not interfere with the cantilever arm, so that the cantilever arm can reach, and pivot through, a vertical position, while still being counterbalanced by the combination of the spring and cable. The cantilever arm is thus capable of a fully counterbalanced range of motion about the pivot point where it is joined to the support structure, from a position extending substantially horizontally on one side of the support structure, to a position extending vertically from the support structure, and to a horizontal position on the other side of the support structure.

Figure 4:
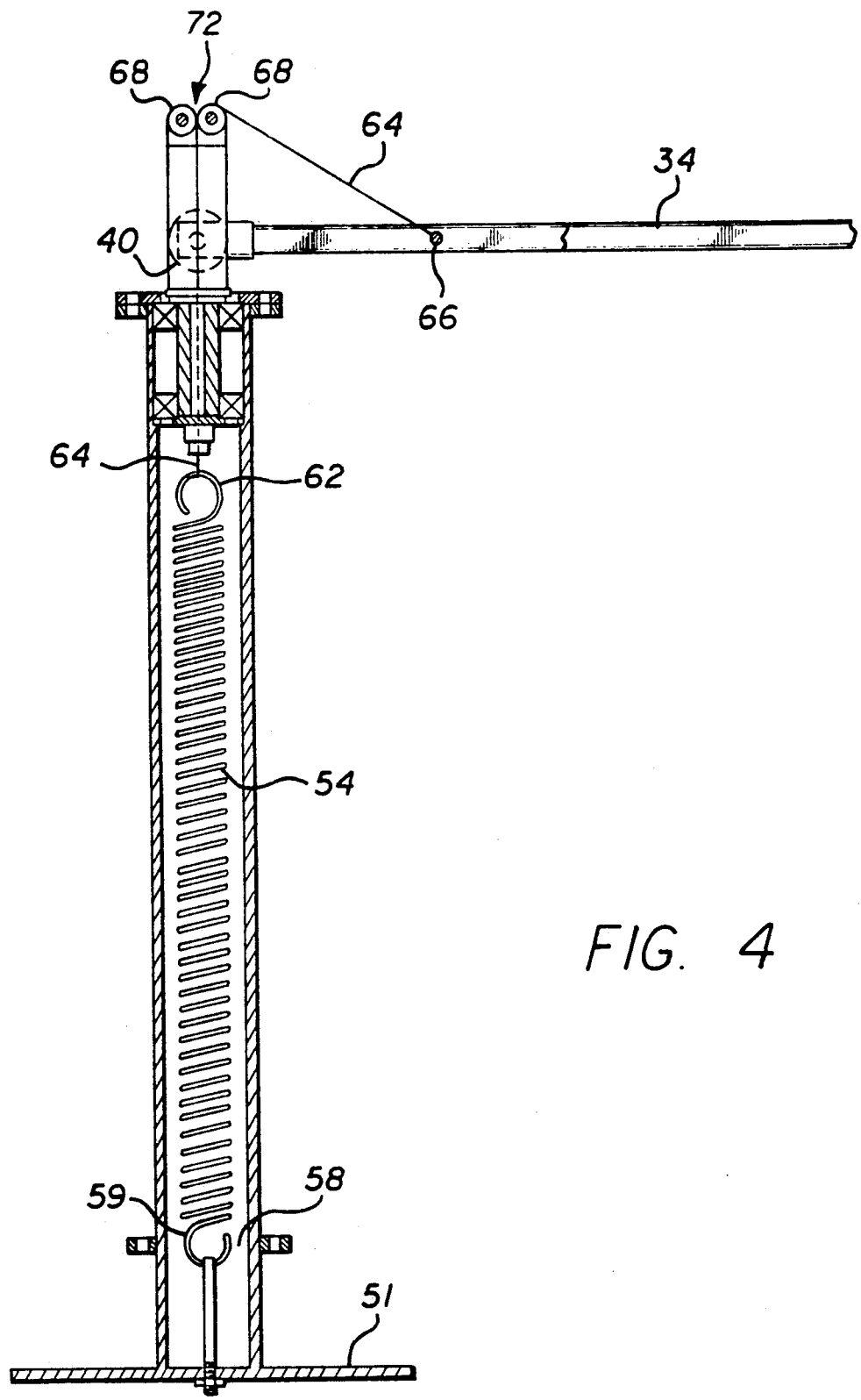
FIG. 4 is simplified front sectional view of the spring housing and cantilevered boom of the suspension system of the invention, showing the boom in a right side horizontal position.
Figure 8:
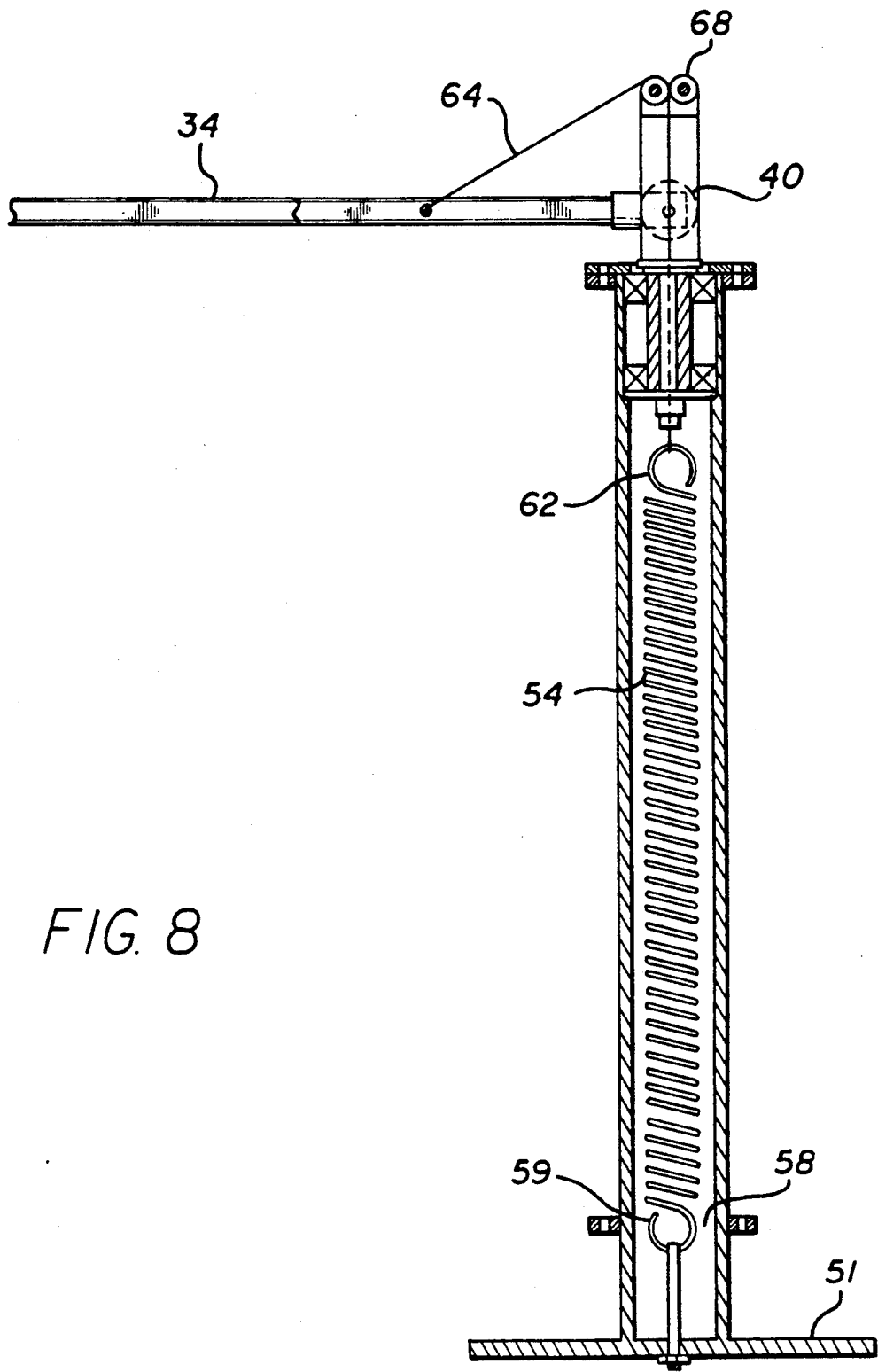
FIG. 8 is a view similar to that of FIG. 4, showing the boom in a lowered, left side horizontal position.

The force of the spring suspending the cantilever arm thus increases as the cantilever arm extends from a vertical position, at which a minimum tension is exerted on the spring, to a horizontal position where the spring is extended to its maximum allowable length permitted by the ring connector, as shown in FIGS. 4 and 8. The spring therefore accordingly acts to counterbalance the moment of the weight of the viewing device and boom arm at the end of the cantilever arm, and the force of the spring is generally to be proportional to the distance between the bell pull point of the spring cable between the pulleys and the attachment of the cable to the cantilever arm.

The length of the cable and the strength of the spring are preferably selected so that effective spring tension is always approximately proportional to, or slightly greater than, the distance between the attachment point on the cantilever arm and the support structure, i.e. the point between the pulleys through with the cable passes. The point between the pulleys of the support post from which the cable extends is actually the tangent point of the cable on one of the pulleys over which the cable passes, so that the point on the support structure from which the cable depends moves slightly as the cantilever arm pivots. This can be corrected by adjusting the length of the cable so that there is a slight tension on the spring even at a vertical position of the cantilever arm.

Figure 5:
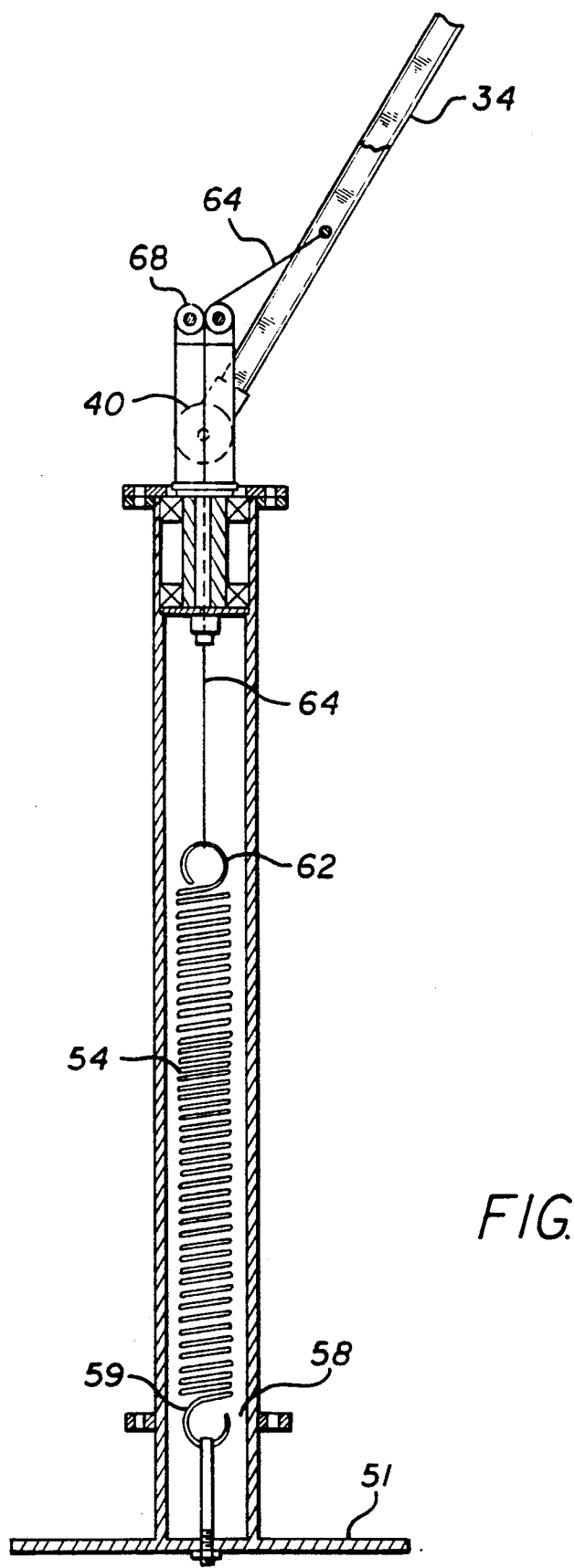
FIG. 5 is a view similar to that of FIG. 4, showing the boom in a partially raised position.
Figure 6:
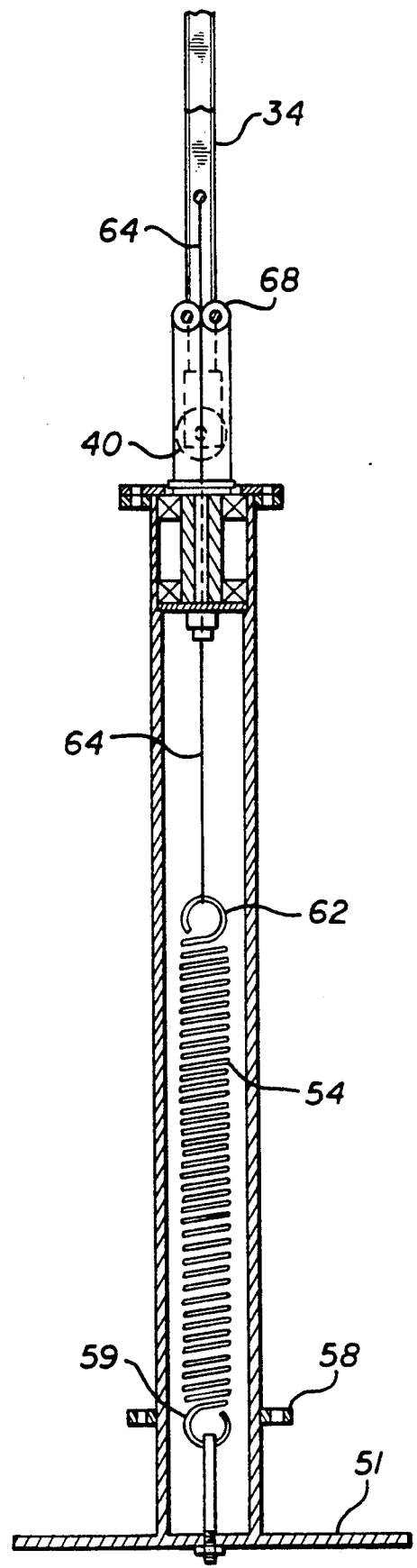
FIG. 6 is a view similar to that of FIG. 4, showing the boom in a vertical position.
Figure 7:
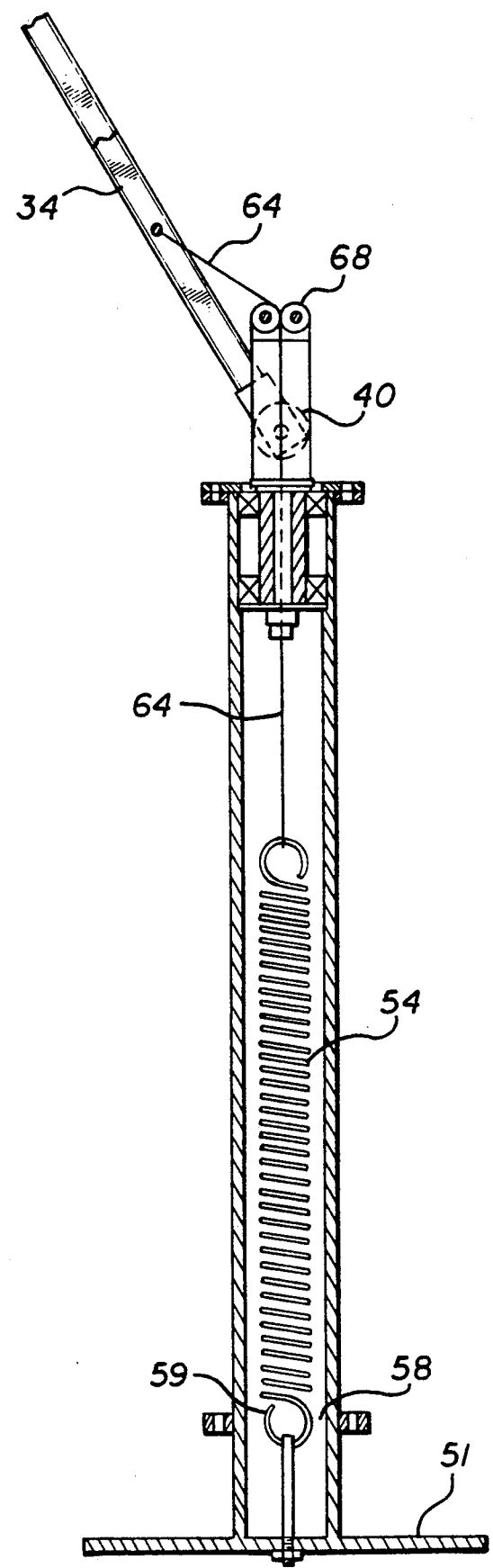
FIG. 7 is a view similar to that of FIG. 4, showing the boom in a partially lowered position.

With reference to FIGS. 4-8, the range of pivoting movement of the cantilever arm will now be briefly described. Beginning from a right side horizontally extended position, shown in FIG. 4, in which the tension spring in the support housing structure is under maximum tension, the cantilever arm may be raised as shown in FIG. 5, proportionally decreasing the tension of the spring counterbalance as the moment of the weight at the outer extremity of the cantilever arm decreases. As the cantilever arm reaches a vertically extended position shown in FIG. 6, the spring is at a minimum preload tension, and does not interfere with the movement of the cantilever arm at this position. The cantilever arm can continue to pivot to the left, as shown in FIG. 7, and to the left side horizontally extended position, increasing the length and tension of the spring proportionally to maintain a counterbalance, but without interfering with the pivoting motion of the cantilever arm. It should be noted that each of the pivoting and rotating joints can be provided with sensors to generate electrical input signals to a visual virtual environment control system for controlling the three-dimensional binocular views depicted in the viewing device.

Figure 9:
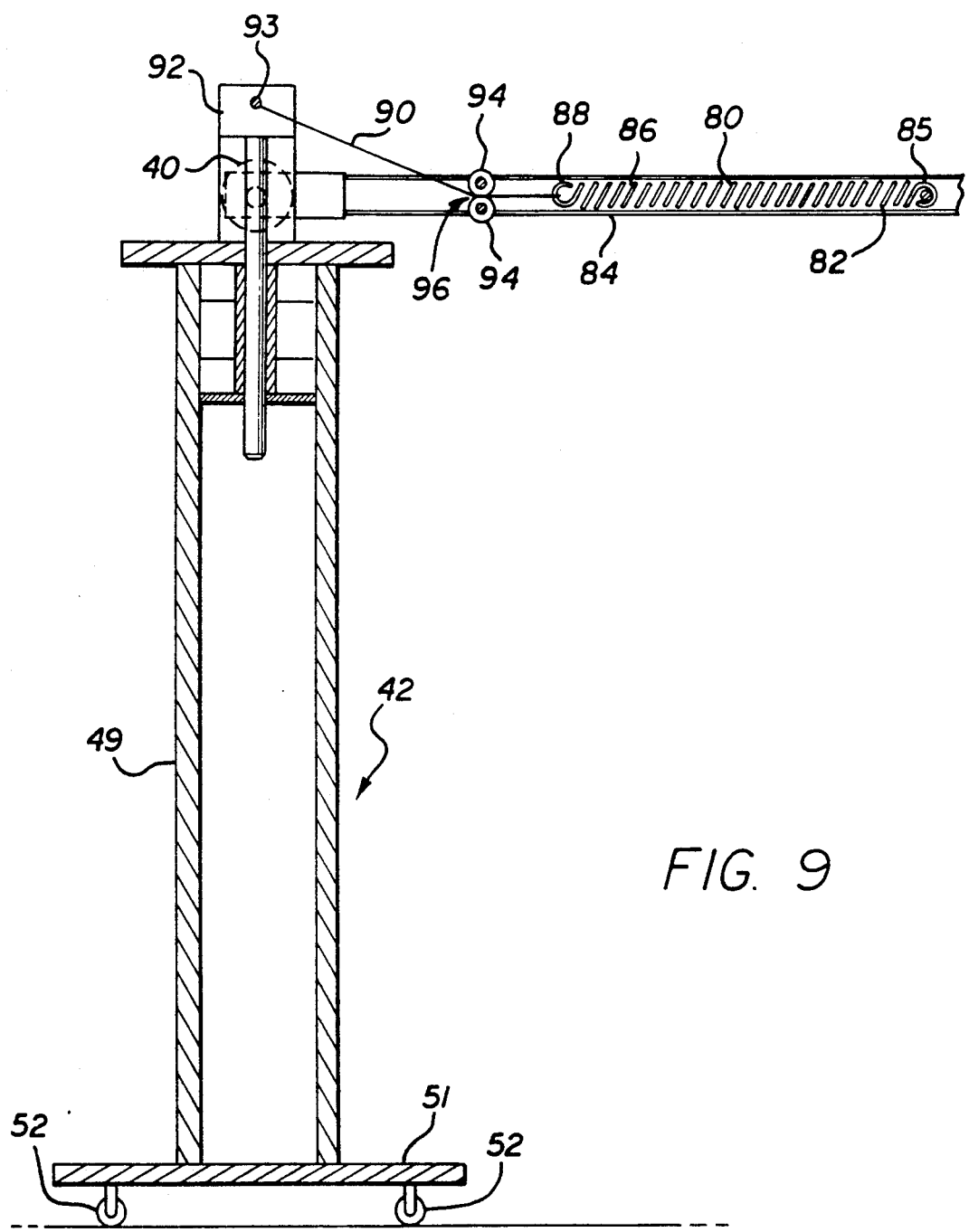
FIG. 9 is a simplified front, sectional view of an alternate embodiment of the spring counterbalanced boom suspension system of the invention.

In an alternate embodiment illustrated in FIG. 9, the counterbalancing spring for supporting the weight of the cantilever arm, boom arm and viewing device comprises a coil spring 80 having a first end 82 secured to the cantilever arm 84 and an opposite end 86 connected by a ring connector 88 to a cable 90. The cable is in turn connected to a support post 92 on the upper end of the support structure, and a pair of pulleys 94 are mounted on the cantilever arm formed of a pair of spaced apart arm members, juxtaposed to form a channel 96 for supporting an intermediate portion of the cable. In this alternate embodiment, the cantilever arm 84 preferably also comprises a pair of spaced apart cantilever arm members, and the pulleys 94 are mounted between the two cantilever arm members. In all other respects, the construction of the viewing device, mounting to the boom arm, counterbalancing of the boom arm, and the support structure are as described for the first described embodiment.

It has thus been demonstrated that the invention provides for a spring counterbalanced boom suspension system for use with visual virtual environment systems, with reduced inertia of the suspension system as compared to conventional counterweighted boom suspension systems, which advantageously also increase the range of motion of the cantilevered boom arm to allow extension of the cantilever arm to a vertical position, and to horizontal positions to either side of the vertical.

It is apparent that obvious modifications of the suspension system may be made, such as counterbalancing the boom arm by an additional spring and cable combination connecting the boom arm and the cantilever arm extending from the support structure.

It will thus be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A viewing apparatus suspension system comprising:
   a) means for viewing an image;
   b) pivotable and rotatable mounting means operatively connected to said means for viewing for supporting the weight of said means for viewing;
   c) a cantilever arm means having first and second ends, said first end being operatively connected to said pivotable and rotatable mounting means, said first end being operative to bear the weight of said mounting means and said means for viewing, and said cantilever arm means having a pivot point at said second end;
   d) support means for supporting said means for viewing, said support means including a longitudinal axis of orientation, a base end and an opposite pivot end pivotally and rotatably connected to said pivot point of said second end of said cantilever arm means to allow for pivotal and rotational movement of said cantilever arm means about said support means pivot end; and
   e) spring means for counterbalancing the weight of said means for viewing and said mounting means, said spring means being connected between said support means and an attachment point on said cantilever arm means intermediate said first end and said pivot point at said second end, and said spring means having a zero free length, whereby said cantilever arm means is capable of a fully counterbalanced range of motion about said pivot point between a horizontal position extending to one side of said support means and a substantially vertical position.

2. The apparatus of claim 1, wherein said pivotable and rotatable mounting means comprises boom arm means having first and second ends, said first end including a pivotable and rotatable joint operatively connected to said means for viewing, and said boom arm means having a pivot point connected to said cantilever arm means.

3. The apparatus of claim 2, wherein said boom arm means includes counterweight means disposed at said boom arm second end for counterbalancing the weight of said means for viewing about said boom arm pivot point.

4. The apparatus of claim 1, wherein said cantilever arm means comprises a pair of cantilever arm members, and said cantilever arm attachment point comprises a cross-member connected between said cantilever arm members.

5. The apparatus of claim 1, wherein said support means base end includes a plurality of supporting wheels.

6. The apparatus of claim 1, wherein said support means includes a housing, and said spring means is disposed within said housing.

7. The apparatus of claim 1, wherein said spring means comprises a tension spring disposed within said support means, said tension spring having a first end secured to said support means and a second end opposite said first spring end, a cable connected between said spring second end and said cantilever arm attachment point, and means for supporting an intermediate portion of said cable mounted to said support means pivot end.

8. The apparatus of claim 7, wherein said cable support means comprises a pair of pulleys mounted to said support means pivot end and having cable support surfaces juxtaposed to provide a channel through which said cable passes.

9. The apparatus of claim 1, said means for viewing further including handle means for guiding the position and orientation of said means for viewing.

10. A viewing apparatus suspension system for use with a visual virtual environment system, comprising:
    a) means for viewing an image;
    b) handle means for guiding the position and orientation of said means for viewing;
    c) boom arm means operatively connected to said means for viewing for supporting the weight of said means for viewing, said boom arm means having first and second ends, said first end including a pivotable and rotatable joint operatively connected to said means for viewing;
    d) a cantilever arm means having first and second ends, said firsts end being operatively connected to said boom arm means, said first end being operative to bear the weight of said boom arm means and said means for viewing, said cantilever arm means second end having a pivot point at said second end, and said boom arm means having a pivot point connected to said cantilever arm means;
    e) support means for supporting said means for viewing, said support means including a longitudinal axis of orientation, a base end and an opposite pivot end pivotally and rotatably connected to said pivot point of said second end of said cantilever arm means to allow for pivotal and rotational movement of said cantilever arm means about said support means pivot end; and
    f) spring means for counterbalancing the weight of said means for viewing and said boom arm means, said spring means being connected between said support means and an attachment point on said cantilever arm means intermediate said first end and said pivot point at said second end, and said spring means having a zero free length, whereby said cantilever arm means is capable of a fully counterbalanced range of motion about said pivot point from a horizontal position on one side of said support means, to a substantially vertical position, and to a substantially horizontal position on an opposite side of said support means.

11. The apparatus of claim 10, wherein said boom arm means includes counterweight means disposed at said boom arm second end for counterbalancing the weight of said means for viewing about said boom arm pivot point.

12. The apparatus of claim 10, wherein said cantilever arm means comprises a pair of cantilever arm members, and said cantilever arm attachment point comprises a cross-member connected between said cantilever arm members.

13. The apparatus of claim 10, wherein said support means base end includes a plurality of supporting wheels.

14. The apparatus of claim 10, wherein said support means includes a housing, and said spring means is disposed within said housing.

15. The apparatus of claim 10, wherein said spring means comprises a tension spring disposed within said support means, said tension spring having a first end secured to said support means and a second end opposite said first spring end, a cable connected between said spring second end and said cantilever arm attachment point, and means for supporting an intermediate portion of said cable mounted to said support means pivot end.

16. The apparatus of claim 15, wherein said cable support means comprises a pair of pulleys mounted to said support means pivot end and having cable support surfaces juxtaposed to provide a channel through which said cable passes.

* * * * *